(12) United States Patent
Vaidya

(10) Patent No.: US 10,057,174 B2
(45) Date of Patent: Aug. 21, 2018

(54) DYNAMIC GROUP MULTIPATHING

(71) Applicant: Avago Technologies General IP (Singapore) Pte. Ltd., Singapore (SG)

(72) Inventor: Niranjan Shankar Vaidya, Campbell, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 290 days.

(21) Appl. No.: 14/881,661

(22) Filed: Oct. 13, 2015

(65) Prior Publication Data

US 2017/0048147 A1 Feb. 16, 2017

Related U.S. Application Data

(60) Provisional application No. 62/205,404, filed on Aug. 14, 2015.

(51) Int. Cl.
| | |
|---|---|
| *H04L 12/803* | (2013.01) |
| *H04L 12/709* | (2013.01) |
| *H04L 12/721* | (2013.01) |
| *H04L 12/26* | (2006.01) |

(52) U.S. Cl.
CPC ........ *H04L 47/125* (2013.01); *H04L 43/0882* (2013.01); *H04L 45/245* (2013.01); *H04L 45/38* (2013.01); *Y02D 50/30* (2018.01)

(58) Field of Classification Search
None
See application file for complete search history.

(56) References Cited

U.S. PATENT DOCUMENTS

| | | |
|---|---|---|
| 6,147,970 A | 11/2000 | Troxel |
| 6,188,698 B1 | 2/2001 | Galand et al. |
| 6,198,723 B1 | 3/2001 | Parruck et al. |
| 6,471,025 B2 | 10/2002 | Wilson et al. |
| 6,788,697 B1 | 9/2004 | Aweya et al. |
| 6,914,882 B2 | 7/2005 | Merani et al. |
| 6,961,307 B1 | 11/2005 | Aweya et al. |
| 7,027,457 B1 | 4/2006 | Chiussi et al. |
| 7,289,514 B2 | 10/2007 | Robotham et al. |
| 7,305,492 B2 | 12/2007 | Bryers et al. |
| 7,359,328 B1 | 4/2008 | Allan |
| 7,483,374 B2 | 1/2009 | Nilakantan et al. |
| 7,454,740 B1 | 6/2009 | Zelig et al. |
| 7,577,096 B2 | 8/2009 | Smith et al. |
| 7,724,661 B2 | 5/2010 | Burns |

(Continued)

*Primary Examiner* — Edan Orgad
*Assistant Examiner* — Saumit Shah
(74) *Attorney, Agent, or Firm* — Sterne, Kessler, Goldstein & Fox P.L.L.C.

(57) ABSTRACT

The present disclosure is directed to a system and method for dynamic and adaptive load balancing. An example method includes receiving, at a network device, a data packet to be sent via one or more aggregation groups, where the aggregation groups each comprise a plurality of aggregate members. The example method further includes determining, based on the data packet, a flow identifier of a flow to which the data packet belongs and determining a state of the flow. The example method also includes determining, based on the flow identifier and the state of the flow, an assigned member of the plurality of aggregate members for the flow and communicating the packet via the assigned member.

20 Claims, 13 Drawing Sheets

(56) References Cited

U.S. PATENT DOCUMENTS

| | | |
|---|---|---|
| 7,724,663 B2 | 5/2010 | Arefi et al. |
| 7,813,271 B2 | 10/2010 | Fourcand |
| 7,839,850 B2 | 11/2010 | Kompella |
| 7,957,284 B2 | 6/2011 | Lu et al. |
| 7,974,202 B2 | 7/2011 | Solomon |
| 8,014,394 B2 | 9/2011 | Ram et al. |
| 8,027,256 B1 | 9/2011 | Subramanian et al. |
| 8,068,416 B2 | 11/2011 | Hu et al. |
| 8,355,328 B2 | 1/2013 | Matthews et al. |
| 8,391,139 B2 | 3/2013 | Matthews et al. |
| 8,824,284 B2 | 9/2014 | Matthews |
| 2003/0161311 A1 | 8/2003 | Hiironniemi |
| 2005/0058069 A1 | 3/2005 | Dauchy et al. |
| 2008/0291882 A1 | 11/2008 | Martinotti et al. |
| 2008/0298236 A1 | 12/2008 | Ervin et al. |
| 2010/0061235 A1 | 3/2010 | Pai et al. |
| 2011/0090789 A1 | 4/2011 | Fung |
| 2011/0258346 A1* | 10/2011 | Said ................... H04L 45/00 709/249 |
| 2013/0121153 A1 | 5/2013 | Matthews et al. |

\* cited by examiner

| Port Loading Threshold (kB) | Quantization |
|---|---|
| 100 | 000 |
| 200 | 001 |
| 300 | 010 |
| 400 | 011 |
| 500 | 100 |
| 600 | 101 |
| 700 | 110 |
| >700 | 111 |

| Queue Size Threshold (Cells or Packets) | Quantization |
|---|---|
| 100 | 000 |
| 200 | 001 |
| 500 | 010 |
| 1000 | 011 |
| 2000 | 100 |
| 5000 | 101 |
| 10000 | 110 |
| >10000 | 111 |

DYNAMIC GROUP MULTIPATHING

CROSS REFERENCE TO RELATED APPLICATIONS

This application claims the benefit of U.S. Provisional Patent Application No. 62/205,404, filed Aug. 14, 2015, which is incorporated by reference herein in its entirety.

FIELD OF THE INVENTION

This application relates generally to processing packets in data networks.

BACKGROUND

Use of network data communications for commercial and non-commercial applications continues to grow at an extremely rapid pace. This growth in the use of data communications is a driving factor for the development and implementation of data networks that provide increase bandwidth and reliability.

One approach that is used to provide such high bandwidth data communication and/or reliable data communication services is the use of aggregation groups. An aggregation group is a grouping of paths between two network devices in a data network that collectively provide higher bandwidth and reliability. Each path in the group can be individually used to communicate data between the two network devices and can include a single link that directly connects the two network devices or multiple links that connect the two network devices through other network devices. Depending on the direction of data being communicated between the two network devices, one of the network devices can operate as a data source and the other network device can operate as a data destination. A link in the path can take the form of a physical link or virtual link. Virtual links, as the term indicates, can be implemented by defining a plurality of logical links. The plurality of logical links can then be implemented using one or more physical links.

Aggregation groups can be formed in a number of different ways. For example, a route computation process (RCP) can be used to determine the connectivity in a data network and compute the "least cost paths" between any two network devices in the data network. A commonly used measure of the cost of a path between two network devices in a data network is the total cost of all the individual links in the path or, more simply, the number of links in the path. The least cost paths computed by the RCP can be pushed to a forwarding information base (FIB) in a data source network device. The data source network device can use the FIB to look up a least cost path to forward packets of a data flow from the data source network device to a data destination network device. If multiple least cost paths exist between the two network devices, the RCP can aggregate them into an aggregation group and the data source network device can assign packets of the data flow to one path (or member) within the aggregation group for forwarding to the data destination network device.

Network devices commonly use a mathematical "hash" based scheme to identify and map data flows to a specific path in an aggregation group. A mathematical hash is computed using key packet attributes, such as select fields in various packet headers. The hash value is then further reduced to select a member of the aggregation group. For instance, a hash can be generated by applying an "XOR" or "CRC" (Cyclic Redundancy Check) function to selected packet attributes such as the source address, the destination address, the priority of the packet and/or the protocol identifier. This gives a "hash digest" of a specific size. Then, if the target aggregation group has K members, a (Hash Value modulo K) operation results in a number in the range (0 to K−1) that can be used to select a member of the aggregation group.

A data flow can be defined in a number of ways. For example, a data flow can be defined as packets traversing between a source and a destination device that are associated with an individual application and/or user and which are part of the same communication session. This can be referred to as a micro-flow. Alternatively, a data flow can be defined more indirectly as a flow that includes packets that mathematically hash to the same value at a network device. Such a data flow can be termed a macro-flow. Accordingly, macro-flows can include multiple micro-flows. For purposes of clarity, the term "flow" or "data flow," as used herein, can refer to any data flow (e.g., micro-flows or macro-flows).

While such hash based approaches can provide for random statistical distribution of flows across members of an aggregation group, such approaches have certain drawbacks. For instance, if there are large differences in the amount of data being communicated in a flow or flows that are assigned to one member of an aggregation group as compared to the amount of data being communicated by a flow or flows that are assigned to another member of the aggregation group, the situation can result in a significant imbalance in the amount of data traffic being communicated by the members of the aggregation group. Such imbalances can result in data congestion and packets being dropped and, therefore, inefficient use of available bandwidth. For instance, one member of an aggregation group can be oversubscribed (e.g., by receiving more data than the member of the aggregation group can transmit in a given time), while other members of the aggregation group are idle or carry very little data traffic.

In addition, all members of an aggregation group can be oversubscribed or can be carrying large amounts of data. In such an instance, no real solution is possible other than the conventional approach of choosing one member from the congested aggregation group to communicate a flow.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

FIGS. 5A and 5B illustrate tables of quality metric quantization in accordance with embodiments of the present disclosure.

The present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the disclosure. However, it will be apparent to those skilled in the art that the disclosure, including structures, systems, and methods, can be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include software, firmware, or hardware (such as one or more circuits, microchips, processors, and/or devices), or any combination thereof. In addition, it will be understood that each module can include one, or more than one, component within an actual device, and each component that forms a part of the described module can function either cooperatively or independently of any other component forming a part of the module, conversely, multiple modules described herein can represent a single component within an actual device. Further, components within a module can be in a single device or distributed among multiple devices in a wired or wireless manner.

Figure 1:
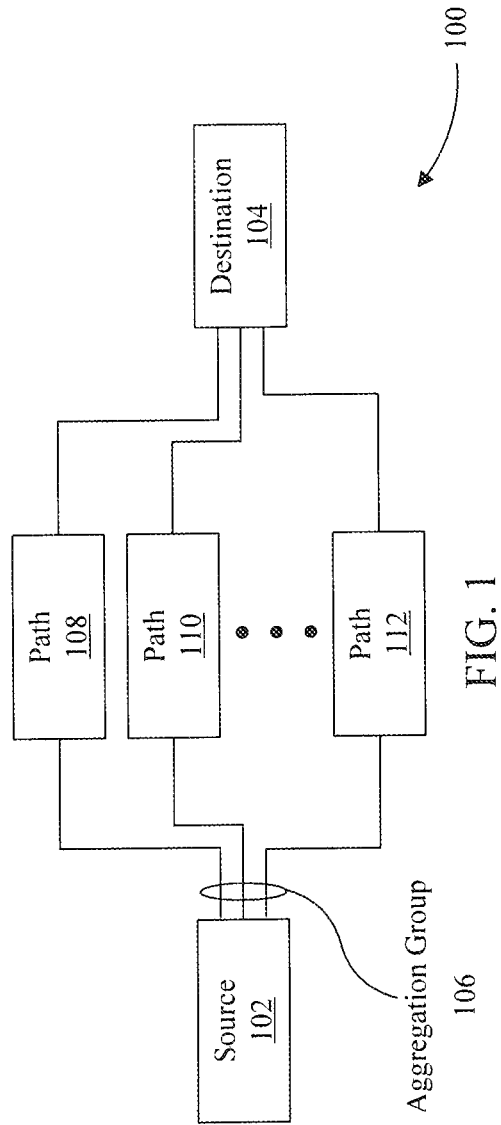
FIG. 1 illustrates a block diagram of a data network in accordance with embodiments of the present disclosure.

This disclosure describes a system and method to enable the use of alternate paths and aggregation groups in the network to improve overall network bandwidth and availability. FIG. 1 illustrates a block diagram of a data network 100 in accordance with embodiments of the present disclosure. The data network 100 can be part of several different types of networks, including a local area network or a wide area network. The data network 100 includes a source network device (source) 102 and a destination network device (destination) 104. Data packets included in one or more data flows can be sent from the source 102 to the destination 104. The source 102 and the destination 104 can be any one of several different types of devices and can be used to implement different layers of a packet communication protocol. For example, the source 102 and the destination 104 can be network switches, routers, network interface cards, or other appropriate data communication devices.

The designation of the source 102 and the destination 104 in this example is by way of illustration only. In other embodiments, the designations of the source 102 and the destination 104 can be reversed. In still other embodiments, the source 102 and the destination 104 can both act as a source for outgoing data flows departing from the respective device and as a destination for incoming data flows arriving into the respective device.

As shown in FIG. 1, the data network 100 also includes an aggregation group 106 that can be used to communicate data between the source 102 and the destination 104. In the example shown in FIG. 1, the aggregation group 106 includes N aggregate members represented by paths 108-112. Each of the paths 108-112 can include one or more physical links and/or one or more virtual links.

The aggregation group 106 can be formed in a number of different ways. For example, a route computation process (RCP) can be used to determine the connectivity in the data network 100 and compute the "least cost paths" between the source 102 and the destination 104. A commonly used measure of the cost of a path between two network devices in a data network is the total cost of all the individual links in the path or, more simply, the number of links in the path. The least cost paths computed by the RCP can be aggregated into the aggregation group 106 and pushed to a forwarding information base (FIB) (not shown) in the source 102. The source 102 can use the FIB to look up the aggregation group 106 in order to forward packets of one or more data flows to the destination 106.

Once the source 102 looks up the aggregation group 106, the source 102 can assign a data flow to one path (or member) within the aggregation group 106 for forwarding the packets of the data flow to the destination 104. Selection of members of the aggregation group 106 for data flows sent from the source 102 to the destination 104 can be made using the techniques described herein. Briefly, selection of a member of the aggregation group 106 (Path 108, Path 110, etc.) for communicating a data flow can be based on, for example, (i) the loading of each aggregate member when the flow is being assigned, (ii) changes in loading conditions among the aggregate members and (iii) whether a given flow has been idle for a long enough period of time that it can be considered as a "new" flow and assigned to a different aggregate member without risk of packets arriving out-of-order. Such re-assignment can be done by taking the skew of packet transmission times for each of the paths into account, such as in the manner described below with respect to FIG. 3.

Figure 2:
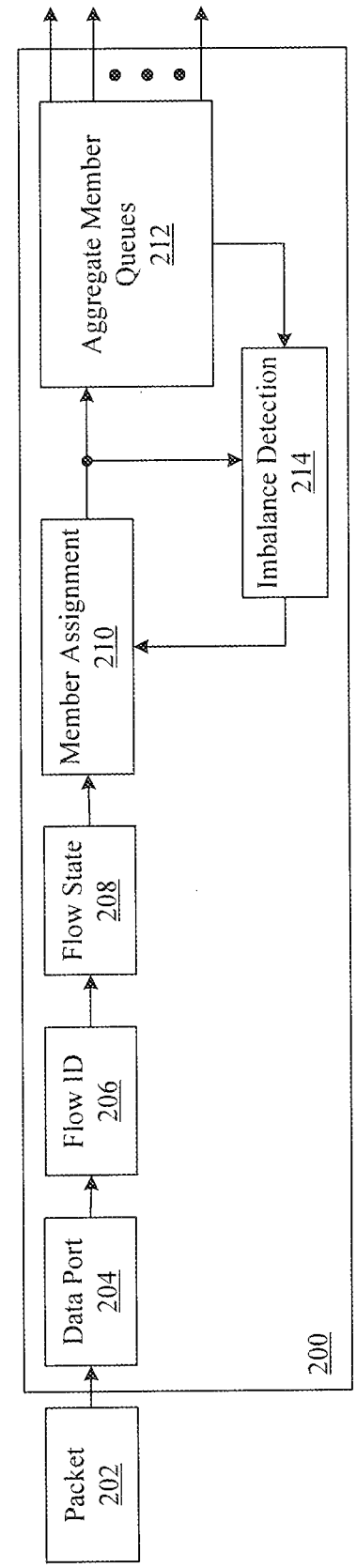
FIG. 2 illustrates a block diagram of a network device in accordance with embodiments of the present disclosure.

FIG. 2 illustrates a block diagram of a network device 200 in accordance with embodiments of the present disclosure. The network device 200 can be used to implement the data traffic load balancing techniques described herein. For example, the network device 200 can be configured to dynamically assign data flows to members of an aggregation group. Such member assignments can take into account the relative loading of the members of the aggregation group and/or changes in the loading conditions of the members of the aggregation group. Further, the network device 200 can be configured to re-assign data flows from one member of the aggregation group to another member of the aggregation group when those flows have been inactive for a sufficient period of time so as to prevent re-ordering of packets of the data flows upon arrival at a next hop network device or a destination network device.

As shown in FIG. 2, the network device 200 can receive a packet 202 at a data port 204. After the packet 202 is received at the data port 204, a flow identification (flow ID) module 206 can process the packet 202 to determine a flow ID for a data flow to which the data packet 202 belongs. An example approach for determining a flow ID is briefly described here and is shown in further detail in FIG. 4. The flow ID can be determined from the packet 202 by first generating a hash value from the packet 202 and using the hash value to determine a corresponding index for the data flow, such as by using an appropriate mathematical transformation (e.g., a modulo operation). In an embodiment, the hash value can be determined from a set of packet fields that remain fixed for a given data flow. Depending on the particular situation, a flow ID can correspond with a single active data flow (e.g., a micro-flow) or can correspond with multiple data flows that are active concurrently (e.g., as part of a macro-flow).

The determined index can be combined with one or more offsets to determine the flow ID, where the flow ID corresponds with an entry in a flow set table, such as the example flow set table illustrated in FIG. 4 and described further below. Such offsets can include, for example, a first offset corresponding with an aggregation group identified in the packet 202. Additionally, the offsets can include a second offset that corresponds with a priority of the packet (and the corresponding data flow). The flow ID module can combine the determined index with the one or more offsets to produce the flow ID for the packet 202.

In the network device 200, a flow state module 208 can be configured to determine a state of the data flow with which the packet 202 is associated. The flow state module 208 can make this determination, for example, by examining an entry in the flow set table that corresponds with the flow ID of the packet 202 as determined by the flow ID module 206. Based on the corresponding flow set table entry, the flow state module 208 can determine that the network device 200 has not previously processed any packets having the determined flow ID for the packet 202 (new flow). In this situation, the flow set table entry can be invalid or contain initialization values (e.g., all zeros or ones). Alternatively, the flow state module 208 can determine, from the flow set table entry, that the packet 202 is associated with a data flow that has been previously observed by the network device 200 and is actively transmitting data (active flow). In this situation, the network device 200 can continue using the most recent aggregate member assignment (as indicated by the flow set table entry) to prevent re-ordering of packets. As yet another alternative, the flow state module 208 can determine that the packet 202 is associated with a data flow for which the network device 200 has previously processed packets, but that the data flow has been inactive for a sufficient period of time (such as discussed with respect to FIG. 3 below) that assigning the data flow to a different aggregate member would be unlikely to result in packet reordering once the packet 202 reaches a destination network device (next hop device) for the packet 202 (inactive flow).

In the network device 200, once the flow state module 208 determines the state of the data flow associated with the packet 202, such as in the fashion described above, a member assignment module 210 can determine which member of an aggregation group of the network device 200 should be used to communicate the packet 202 to its next destination.

If the data flow associated with the data packet 202 is determined to be eligible for member assignment (e.g., because the data flow has not been previously seen) or reassignment (e.g., because the data flow has been inactive sufficiently long enough to prevent reordering), the network device 200 (e.g., the member assignment module 210) can assign the data flow associated with the packet 202 to an aggregation group member using one or more respective quality metrics associated with each of the aggregation group members, such as using the techniques described herein. Once a member assignment has been made, the network device 200 (e.g., the member assignment module 210) can be configured to make corresponding entries in a flow set table, where the entries indicate the assigned member as well as a timestamp indicating a time at which the packet 202 is processed. Such timestamps can be used to determine whether data flows processed by the network device 200 have been inactive long enough to allow for reassignment without significant risk of causing packet reordering.

If a data flow associated with the data packet 202 is not eligible for assignment or reassignment (e.g., has been previously seen and has packets being actively transmitted), the network device 200 (or, more particularly, the member assignment module 210) can use a previously assigned aggregation group member, such as indicated in a flow set table entry associated with the data flow. Each time a packet associated with an active data flow is processed, the flow set table entry for that flow can be updated with a new timestamp. Using such an approach, the delay between packets of a given data flow can be readily determined, where the determined delay between packets of the given data flow can be used to determine whether the given data flow can receive a new assignment without significant risk of packet reordering.

After the assigned aggregation group member is determined (by assignment, reassignment, or using an existing assignment), the network device 200 can queue the data packet 202 in a respective data queue for the assigned aggregation group member in a set of aggregate member queues 212 for the aggregation group. The network device 200 can then communicate the data packet 202, in turn with other packets queued in the aggregate member queues 212, to another network device, such as a next hop network device or a destination network device, using the assigned aggregation group member.

As shown in FIG. 2, the network device 200 can also include an imbalance detection module 214. The imbalance detection module 214 can receive information regarding member assignments for data packets from member assignment module 210 and can also receive information regarding the amount of data that is queued for each member of an aggregation group from the aggregate member queues 212. Based on the information received from the member assignment module 210 and the aggregate member queues 212, the imbalance detection module 214 can determine one or more quality metrics for the aggregation group members, where the quality metrics are indicative of data traffic loading for each aggregate member. These quality metrics can be communicated to the member assignment module 210 and used by the member assignment module 210 when making aggregation group member assignments and reassignments for data flows being processed by the network device 200.

Figure 3:
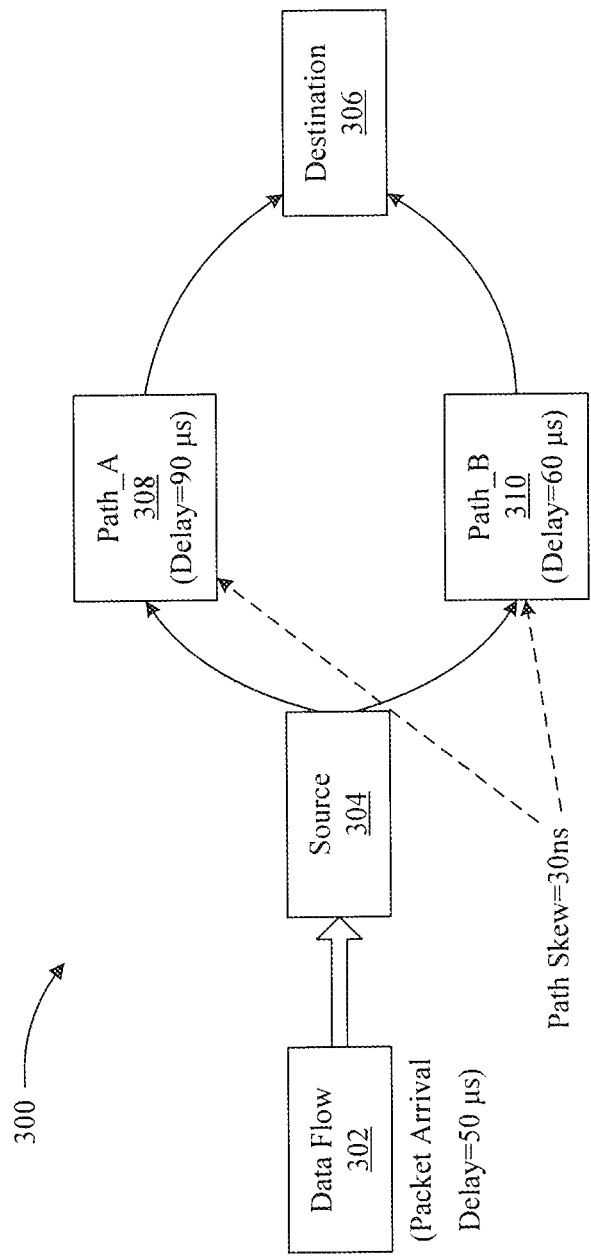
FIG. 3 illustrates a block diagram of an approach for determining if a data flow is eligible for load balancing reassignment in accordance with embodiments of the present disclosure.

FIG. 3 illustrates a block diagram of a data network 300 that can be used to implement an approach for determining if a data flow is eligible for load balancing reassignment in accordance with embodiments of the present disclosure. In the data network 300, a data flow 302 arrives at a source network device (source) 304. The source 304, in this example, has two aggregate members in an aggregation group to which it can assign the data flow 302: Path_A 308 and Path_B 310. For this example, it is assumed that Path_A 308 is initially selected as the aggregate member assignment for transmitting packets of data flow 302 from the source 304 to a destination network device (destination) 306. As shown in FIG. 3, an end-to-end delay (or latency) for the Path_A 308 is 90 µs, while the end-to-end delay for the Path_B 310 is 60 is. In this example, the skew (or difference in delay) between the Path_A 308 and the Path_B 310 is therefore 30 µs.

As indicated in FIG. 3, the data flow 302 has a packet arrival delay of 50 µs between two sequential packets of the data flow 304. In this instance, the packet arrival delay of 50 µs is greater than the path skew of 30 µs between the aggregate members of the data network 300. Accordingly, in this situation, the flow 304 can be reassigned from the Path_A 308 to the Path_B 310 without significant risk of packet reordering occurring at the destination 306.

In such an approach, the path skew can be estimated or measured (e.g., using software). Such path skew measurements can be used to determine an inactivity threshold for use in determining whether data flows are eligible for aggregation group member reassignment. For instance, path skew between the various paths of an aggregation group can be measured or estimated. The largest path skew value (or the largest path skew value plus some margin) can then be used as an inactivity threshold. Using such an approach, if the arrival delay of packets of a given data flow is greater than the inactivity threshold, the corresponding data flow can then be eligible to receive a new aggregation group member assignment. In yet another approach, packets of a given data flow can be considered eligible to receive a new aggregation group member assignment under all conditions.

In other approaches, path skew values between individual paths can be used for determining inactivity durations to determine whether or not data flows are eligible for aggregation group member reassignment. Measurements or estimates of path skews (and the determination of corresponding inactivity thresholds) can be made dynamically (e.g., during processing of data flows). Alternatively, measurements or estimates of path skews (and the determination of corresponding inactivity thresholds) can be made as part of initialization of a corresponding network device and statically set.

In an example embodiment, such inactivity thresholds can be used to determine whether a data flow is active or inactive (as discussed above) for purposes of determining whether data flows are eligible for aggregation group member reassignment. For instance, determining that a data flow is inactive can include determining a difference between a previous timestamp associated with the flow in a flow set table and a timestamp associated with the current packet (i.e., the arrival delay of packets of the flow). If the difference is greater than an inactivity threshold, the flow would be considered to be inactive and eligible for reassignment to a new aggregate member. If, however, the difference is less than or equal to the inactivity threshold, the flow would be considered to be active and, therefore, not eligible for reassignment.

Figures 4A, 4B:
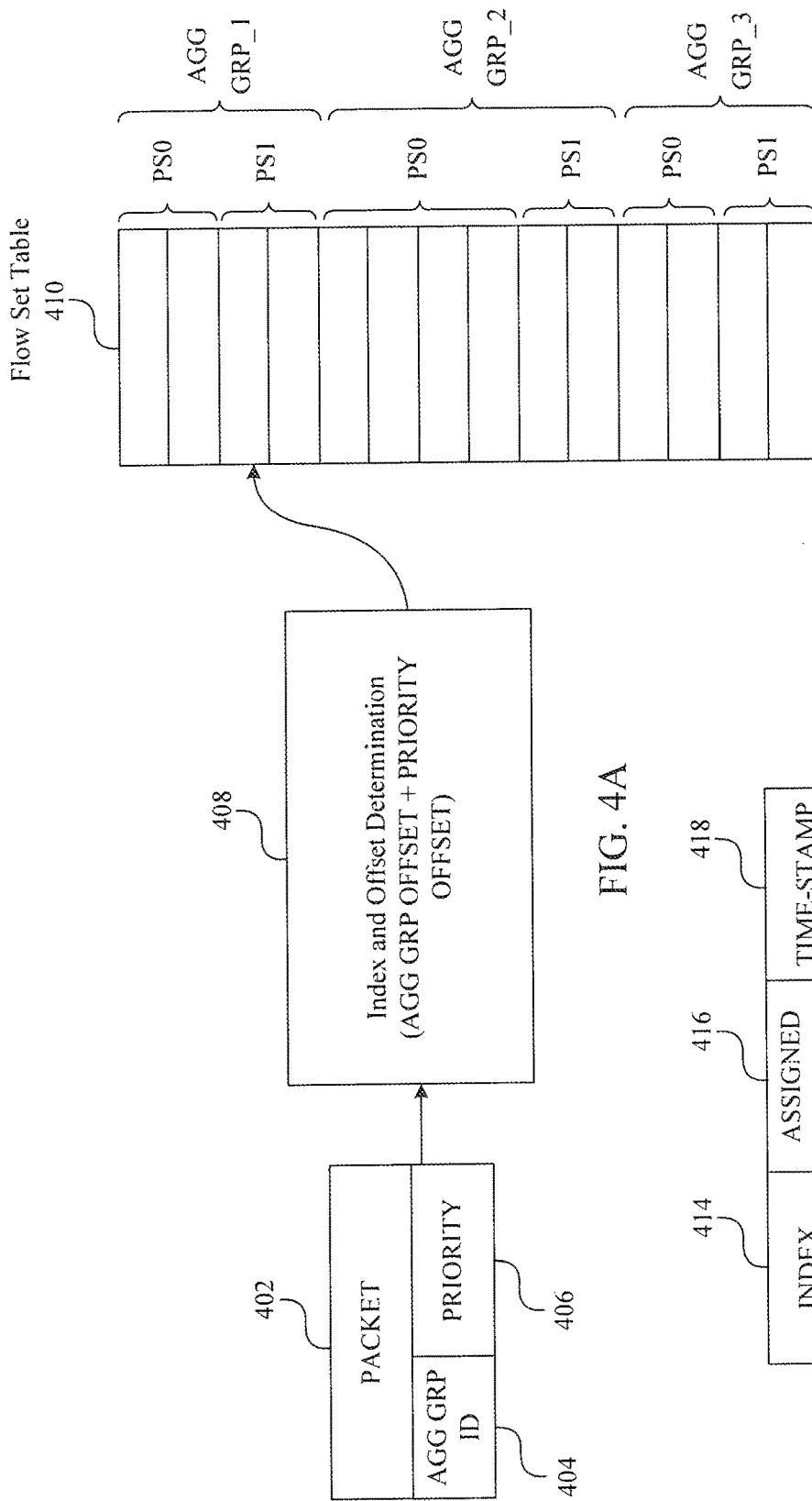
FIGS. 4A and 4B illustrate an example flow set table and an approach for indexing the flow set table in accordance with embodiments of the present disclosure.

FIGS. 4A and 4B illustrate an example flow set table 410 and an approach for indexing the flow set table 410 in accordance with embodiments of the present disclosure. FIG. 4B specifically illustrates an example flow set table entry 412 that can be included in the flow set table 410 illustrated in FIG. 4A. The approaches illustrated in FIGS. 4A and 4B can be implemented in, for example, the network device 200 illustrated in FIG. 2. However, the approaches illustrated in FIGS. 4A and 4B can be implemented in other network devices as will be appreciated by one of ordinary skill in the art.

In FIG. 4A, a packet 402 can be provided to an index and offset determination module 408. In the approach illustrated in FIG. 4A, the index and offset determination module 408 can be used to determine a flow ID, such as was previously described. As shown in FIG. 4A, the packet 402 can include an aggregation group identifier (ID) 404 and a priority 406. The priority 406 can take the form of p-bits of the packet 402 or can be included in the packet in another appropriate fashion. As is known, the packet 402 can include a number of other elements, such as various header fields and a data payload, for example.

The index and offset determination module 408 can determine an index value for the packet 402 based on one or more fields of the packet. As previously discussed, a fixed set of packet fields that remain constant for a given data flow can be used to determine the index for the packet 402. For example, a hash value can be calculated and/or one or more mathematical operations can be performed on the fixed set of packet fields to determine the index. In certain embodiments, the aggregation group ID 404 and/or the priority 406 of the packet 402 can be used to determine the number of aggregation group members in the corresponding aggregation group and/or priority set when determining the index. For instance, the number of members in a corresponding aggregation group and priority set of that aggregation group can be used in a modulo function to determine the index value for the packet 402.

In the approach shown in FIG. 4A, a determined index value can be combined with two offset values to determine a flow ID that is used to index the flow set table 410. For instance, in FIG. 4A, the index value for the packet 402 can be combined with an aggregation group offset and a priority set offset to determine the flow ID for the packet 402. As shown in FIG. 4A, the flow set table 410 includes flow set entries for each of three aggregation groups 1-3 and two priority sets 0 and 1 within each aggregation group. In this example, the aggregation group 1 can have an offset of 0, since the aggregation group 1 flow set entries are at the top of the flow set table 410. The aggregation group 2 can have an offset of 5 as the first entry for the aggregation group 2 is at the fifth location in the flow set table 410. Similarly, in the example shown in FIG. 4A, the aggregation group 3 can have an offset of 11 as the first entry for the aggregation group 3 is at the eleventh location in the flow set table 410.

In the example shown in FIG. 4A, a flow ID can also include a second offset corresponding with a priority 406 of the packet 402. As shown in FIG. 4A, the number of flow set table entries for each priority set can vary by aggregation group. Therefore, the priority set offsets for the packet 402 can depend on the aggregation group ID 402, as well as the priority 406. For example, the priority set offsets for priority set 0 for aggregation groups 1-3 are all 0, because the priority set 0 entries for each of the aggregation groups 1-3 are listed first in their respective portions of the flow set table 410. However, the priority set offset for aggregation group 1, priority set 1 would be 3, the priority set offset for aggregation group 2, priority set 1 would be 5, and the priority set offset for aggregation group 3, priority set 1 would be 3, as can be seen in FIG. 4A. In other embodiments, the entries of the flow set table 410 can be arranged differently, such as being grouped first by priority set and then being group by aggregation group ID.

As shown in FIG. 4B, the flow set table entry 412 can include an index 414, an assigned member entry 416 and a time stamp 418 for a last packet of a data flow corresponding with the flow set entry 412. In this example, the aggregation group that is used to transmit the packet 402 is explicitly indicated in the packet 402, as is the priority of the packet and can be used to determine the aggregation group offset and priority offset. Therefore, in this example, the index 414 can be an index to a specific flow set table entry 412 within the portion of the flow set table 410 that corresponds with the aggregation group ID 404 and the priority 406 indicated in the packet 402.

The assigned member entry 416 indicates a currently assigned aggregation group member for a corresponding data flow and the time stamp 418 is the time stamp of the last packet that was processed for the corresponding data flow. The time stamp entry 418 can be subtracted from a time stamp included in a next packet of the corresponding data flow to determine whether the data flow is active (e.g., the difference is less than or equal to an inactivity threshold) or inactive (e.g., the difference is greater than the inactivity threshold). As previously discussed, if it is determined that the corresponding data flow is active, the aggregate member indicated by the member assignment 416 will be used to transmit the packet 402. However, if it is determined that the corresponding data flow is inactive, the corresponding data flow can receive a new aggregate member assignment, which can be the same aggregate member as the previous aggregate member assignment, or can be a different aggregate member, depending the respective states (e.g., data communication loading) of the corresponding aggregation group members that are available for assignment.

In this example, when an aggregate member assignment is made, the member assignment entry 416 of the flow set entry 412 for the corresponding data flow is updated to reflect the current aggregate member assignment. Further, each time a packet 402 of the corresponding data flow is processed, the time-stamp entry 418 of the corresponding flow set table entry 412 is updated using, for example, a current system time. Alternatively, the time stamp entry 418 can be updated using a time stamp provided by a network device that is processing the corresponding data flow.

Figure 5C:
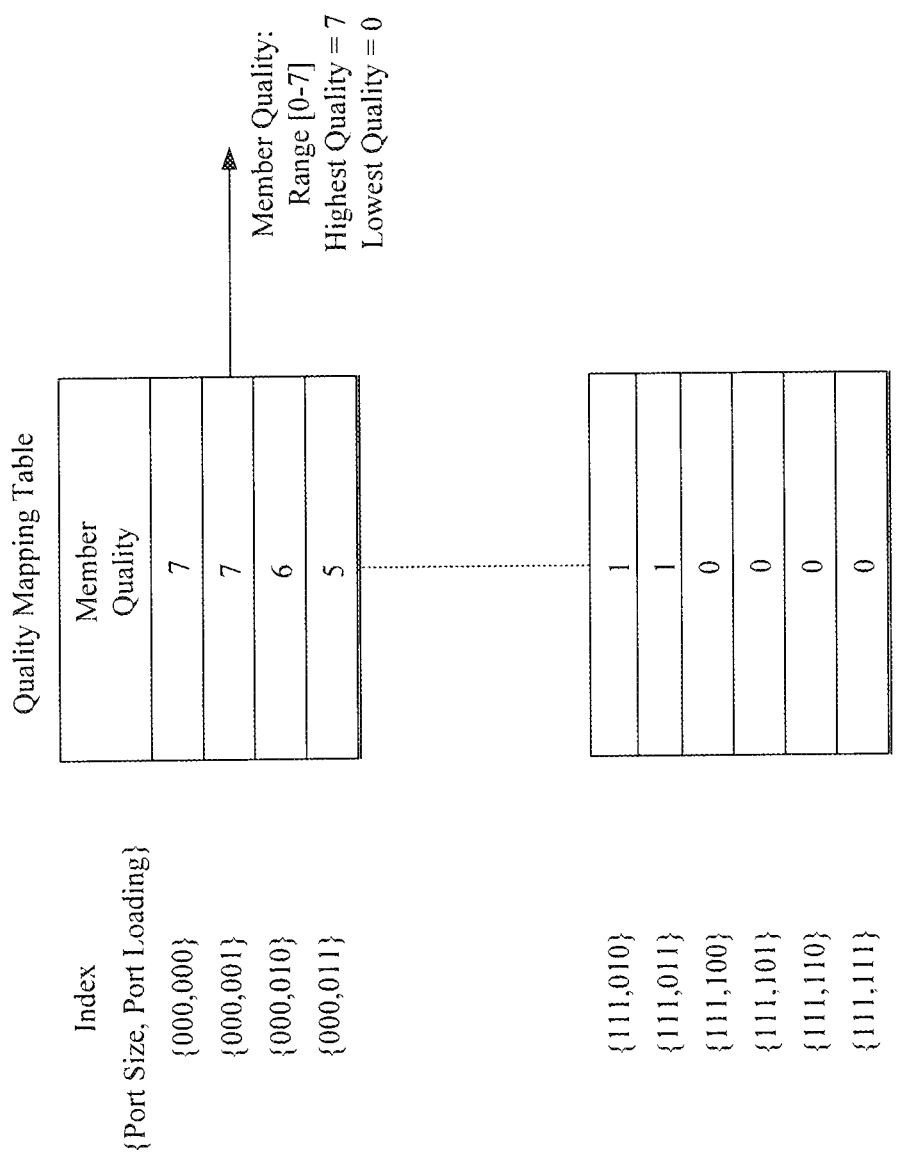
FIG. 5C illustrates a quality mapping table based on the quality metrics of FIGS. 5A and 5B in accordance with embodiments of the present disclosure.

FIGS. 5A and 5B respectively illustrate quality metric quantization tables 500 and 510 in accordance with embodiments of the present disclosure. FIG. 5C illustrates a quality mapping table based on the quality metrics of FIGS. 5A and 5B in accordance with embodiments of the present disclosure. The approach illustrated in FIGS. 5A-5C can be used to assign a respective combined quality metric to each member of an aggregation group. These respective quality metrics can then be grouped into quality bands or loading bands. In an example network device, aggregate member assignments for data flows being processed by a network device can be made from a subset of aggregate members that have the quality metrics in the first non-empty quality band, or the highest quality band that includes at least one aggregate member. The quality metrics described with respect to FIGS. 5A-5C are given by way of example and other quality metrics can be used when assigning aggregate members for transmitting data flows using the techniques described herein.

FIG. 5A illustrates a table 500 in accordance with embodiments of the present disclosure that can be used to quantize port loading into a first quality metric. In the table 500, the first column includes port loading threshold values, which can be compared with the amount data that is assigned to each aggregate member of an aggregation group over a given period of time. The threshold values in table 500 are given by way of example. In other embodiments, different threshold values can be used. In other embodiments, a different number of threshold values (fewer or more threshold values) can be used.

In the example table 500, eight port (aggregate member) loading threshold values are used, which correspond with a three bit quantization value (binary values 000-111). As shown in table 500 in FIG. 5A, port loading of less than 100 kilobytes (kB), in this example, would be quantized with a port loading quality metric of 000. As the threshold values increase in table 500, the corresponding quantization values for the port loading quality metric also increase to represent the higher loading (and lower quality metric). For instance, port loading between 400 kB and 500 kB would be quantized with a port loading quality metric of 100. For sake of brevity, each threshold value in table 500 (and table 510) is not specifically described here.

In an example network device, port loading can be periodically measured and compared with the threshold values in the table 500, such as using an imbalance detection module 214 as illustrated in FIG. 2. The measured port loading values for each member that are compared with the threshold values in table 500 can indicate instantaneous loading or, alternatively, can indicate average loading over time. For instance, loading can be computed using a weighted average calculation. In other embodiments, the table 500 can be used to quantify respective loading quality metrics for priority sets instead of aggregate members (ports).

FIG. 5B is a table 510 in accordance with an example embodiment that can be used to quantify data queue sizes into a second set of respective quality metrics (e.g., for members of an aggregation group or, alternatively, for a plurality of priority sets). In the table 510, the first column includes queue size threshold values (e.g., in number of cells or packets), which can be compared with instantaneous queue sizes or average queue sizes (e.g., weighted average queue sizes) to determine a corresponding queue size quality metric. As with the table 500, the threshold values in table 510 are given by way of example. In other embodiments, different threshold values can be used. In other embodiments, a different number of threshold values (fewer or more threshold values) can be used.

In the example table 510, eight queue size threshold values are used, which each correspond with a respective three bit quantization value (binary values 000-111). As shown in table 510 in FIG. 5B, a queue size of less than 100 (e.g., 100 cells or packets), in this example, would be quantized with a queue size quality metric of 000. As with the table 500, as the threshold values increase in table 510, the corresponding quantization values for the queue size quality metric also increase to represent the larger queue sizes (and lower quality metric). For instance, queue size measurements between 500 and 1000 would be quantized with a queue size quality metric of 011.

In an example network device, queue sizes can be periodically measured and compared with the threshold values in the table 510. For instance, queue size information can be provided to the imbalance detection module 214 of the network device 200 by the aggregate member queues. The measured queue size values for each aggregate member that are compared with the threshold values in table 510 can indicate instantaneous queue sizes or, alternatively, can indicate average queue sizes over time, as was noted above. In other embodiments, as also indicated above, the table 510 can be used to quantify queue size quality metrics for a set of priority queues (priority set queues) associated with the aggregate member.

FIG. 5C illustrates an approach for combining (mapping) the quality metrics described above with respect to tables 500 and 510 into a single quality metric with a value between 0 and 7 in accordance with embodiments of the present disclosure. In example embodiments different mapping relationships for combining those quality metrics can be used. The particular mapping arrangement can depend on the embodiment and can, for example, be selected by a user. Alternatively, such quality metric mapping can be dynamic and adjusted over time in order to improve the efficiency of aggregate member assignments in a network device. Such dynamic adjustment can be performed by the user, software, or some other control mechanism. The particular approach shown in FIG. 5C is given by way of example. It will be appreciated that a number of other possible mapping relationships are possible.

As shown in FIG. 5C, when the values of the port loading quality metric of FIG. 5A and the values of the queue size quality metric of FIB. 5B are combined and arranged in the sequence as shown in FIG. 5C, those combined quality metrics can be mapped to a single quality metric, as shown in FIG. 5C, designated member quality. In this example, a combined member quality metric of 7 represents the highest quality members, while a combined quality metric of 0 represents the lowest quality members. For instance, when both the queue size metric and the port loading metric are 000, the combined quality metric maps to 7. Also, when both the queue size quality metric and the port loading quality metric are 111, the combined quality metric maps to 0. The particular mapping arrangement used to generate such a combined quality metric can be referenced as a quality mapping function and can be accomplished in a number of fashions, such as using a lookup table, using one or more mathematical transformations, such as comparison with a set of thresholds, or other appropriate techniques. Depending on the particular embodiment, a quality mapping function for each aggregation group of a network device can be arbitrarily selected from a plurality of quality mapping functions, such as the quality mapping function illustrated in FIG. 5C.

After respective combined quality metrics are determined for a set of aggregate members, those combined quality metrics can be grouped into loading/quality bands corresponding with the combined quality metrics. Such quality bands can then be used to assign aggregate members to data flows, such as using the approaches described herein.

Figure 6:
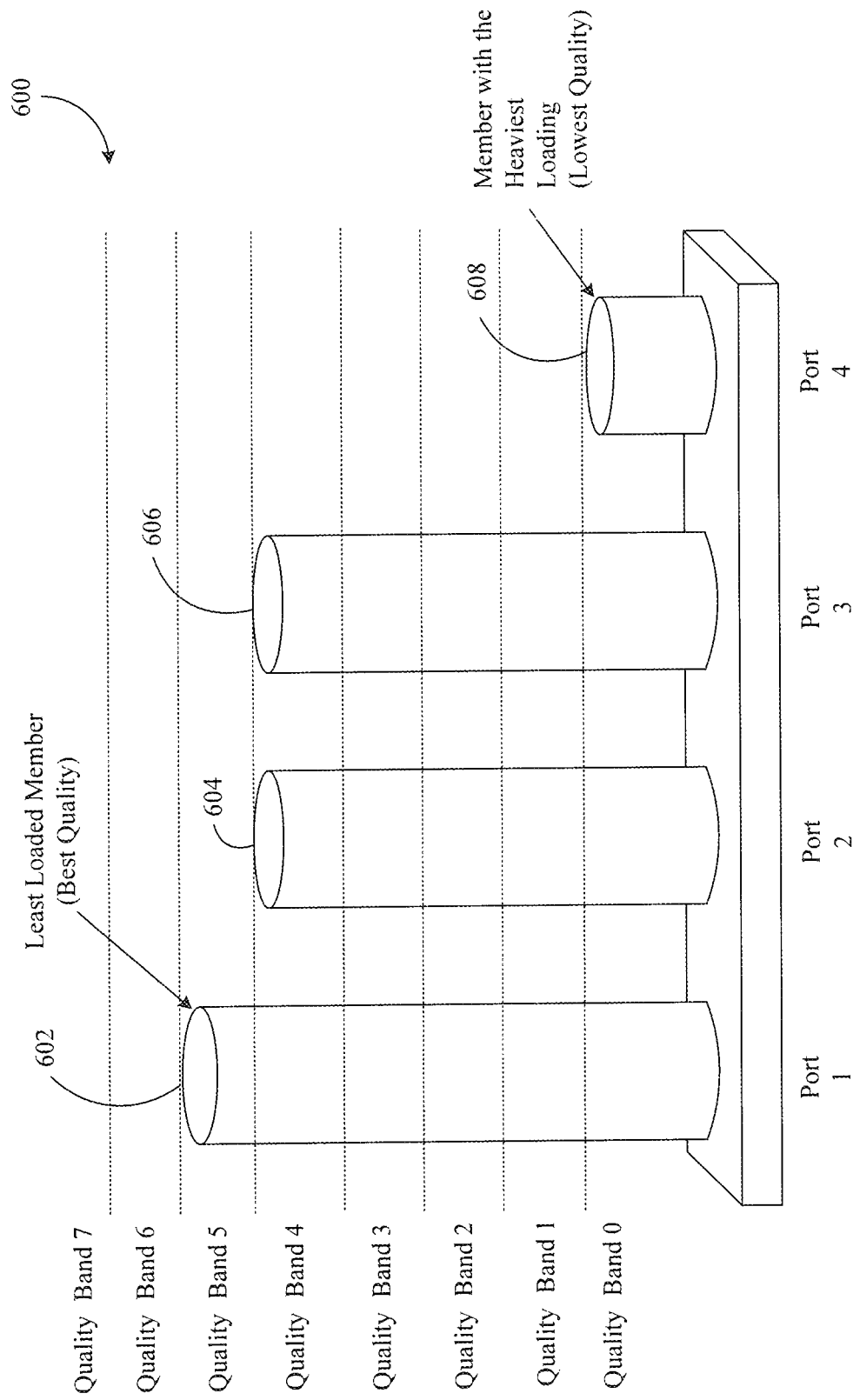
FIG. 6 illustrates a graph of quality/loading bands in accordance with embodiments of the present disclosure.

FIG. 6 illustrates a graph 600 of example quality band groupings for an aggregation group having four members (Port 1-Port 4) in accordance with embodiments of the present disclosure. In other embodiments, the graph 600 can represent quality band groupings for a single priority set. The groupings shown in the graph 600 correspond with a quality metric having values in a range of 0-7, such as the combined quality metric described above with respect to FIG. 5C. In this example, as shown in the graph 600, the quality metric 602 for Port 1 is in Quality Band 5, which can correspond with a combined quality of metric of 5. In the table 600, the quality metrics 604 and 606 for Port 2 and Port 3, respectively, are in Quality Band 4, which can correspond with a combined quality metric of 4. Also in the table 600, the quality metric 608 is in Quality Band 0, which can correspond with a combined quality metric of 0.

In this example, when assigning an aggregate member to a data flow (e.g., a new data flow or inactive data flow, as were described above) using the techniques described herein, a network device can examine the groupings in the graph 600 to select the highest non-empty quality band (the highest quality band having at least one aggregate member in it), which in this case is Quality Band 5. The network device can them assign an aggregate member to the data flow from the selected quality band. In this case, because a single aggregate member (Port 1) is present in Quality Band 5, the selection process is straightforward and Port 1 would be selected as the assigned member for the data flow for which an aggregate member assignment is being made. However, in situations where more than one aggregate member is present in the highest non-empty quality band, other approaches for aggregate member selection can be used.

In some examples, an aggregate member assignment can be made by randomly selecting an aggregate member from the aggregate members present in the highest non-empty quality band. In other embodiments, a round-robin selection method can be used for aggregate member assignment selection. In still other embodiments, other deterministic and non-deterministic approaches for aggregate member selection can be used. For instance, in one approach, in one approach member assignment can be weighted based on quality metrics, such as those described herein.

FIGS. 7-10 are flowcharts that illustrate methods that can be used to implement the load balancing techniques described herein. It will be appreciated that these methods can be implemented using the techniques described with respect to the other FIGS. of the application, or can be combined with each other in appropriate combinations. Further, for each of the methods described herein, the method operations can be performed in any appropriate order. For instance, in some situations, certain operations can be performed concurrently, or can be performed in a different order than illustrated and described herein.

Figure 7:
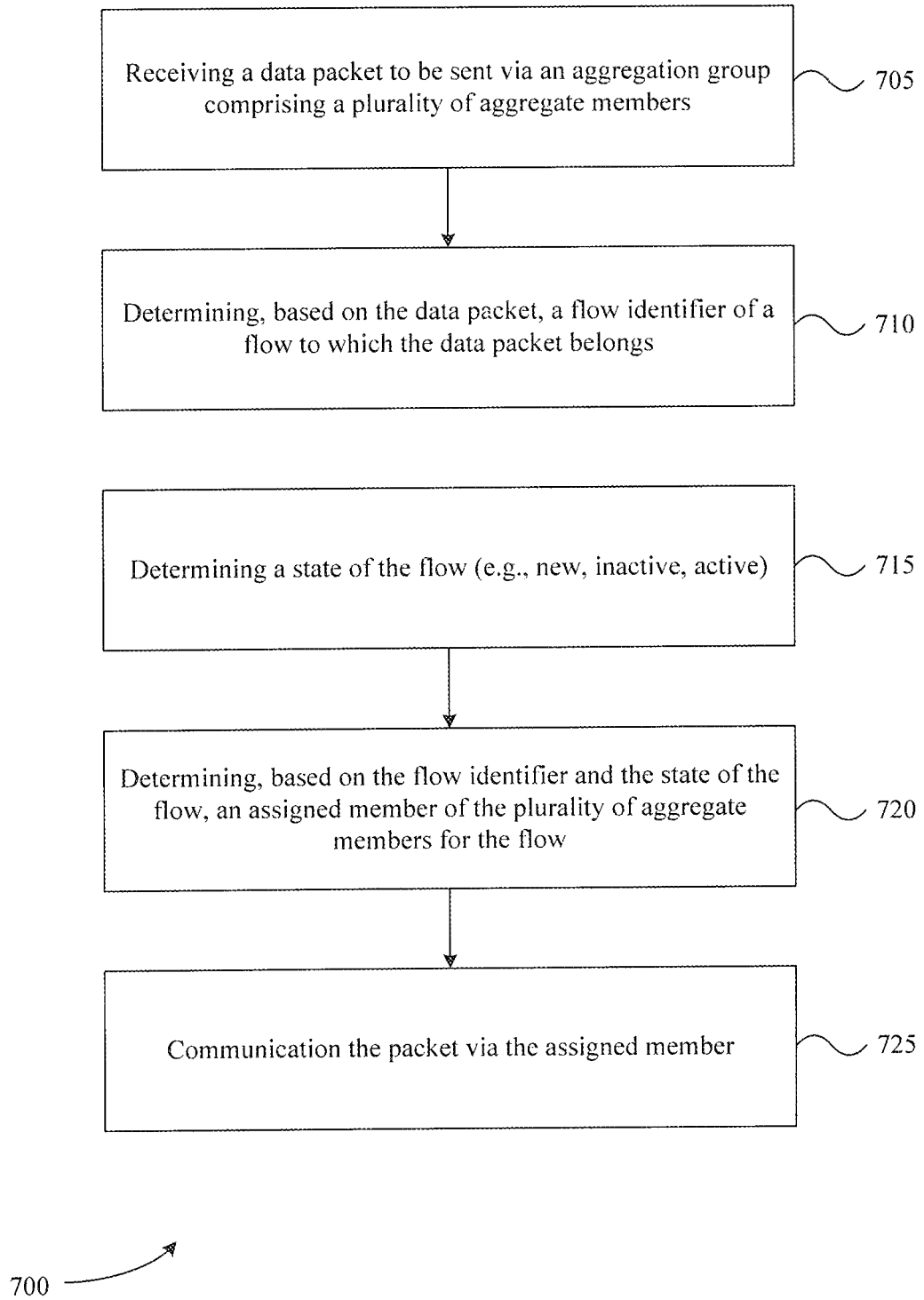
FIG. 7 illustrates a flowchart of a method for dynamic load balancing in accordance with embodiments of the present disclosure.

FIG. 7 illustrates a flow chart 700 of a method for dynamic load balancing in accordance with embodiments of the present disclosure. The method of the flowchart 700 can be implemented, for example, in the network device 200 illustrated in FIG. 2. As illustrated in FIG. 7, the method of the flowchart 700, at block 705 includes receiving, e.g., at a network device, a data packet to be sent via an aggregation group, where the aggregation group comprises a plurality of aggregate members. At block 710, the method of the flowchart 700 includes determining, based on the packet, a flow ID, such as using the approaches described above.

The method of the flowchart 700 can further include (though not explicitly shown in FIG. 7) indexing a flow set table (such as the flow set table 412) using the flow ID, for instance, in the manner described above. At block 715, the method of the flowchart 700 includes determining a state of the flow, such as by using a timestamp included in the flow set table and a timestamp associated with the current packet, or by determining that a corresponding entry in the flow set table is not valid, such as using the techniques described above. At block 720, the method of the flowchart 700 can include determining, based on the flow identifier and the state of the flow, an assigned member of the plurality of aggregate members for the flow, such as using quality metrics and associated quality bands, as was previously described. At block 725, the method of the flowchart 700 includes communicating the packet via the assigned member.

Figure 8:
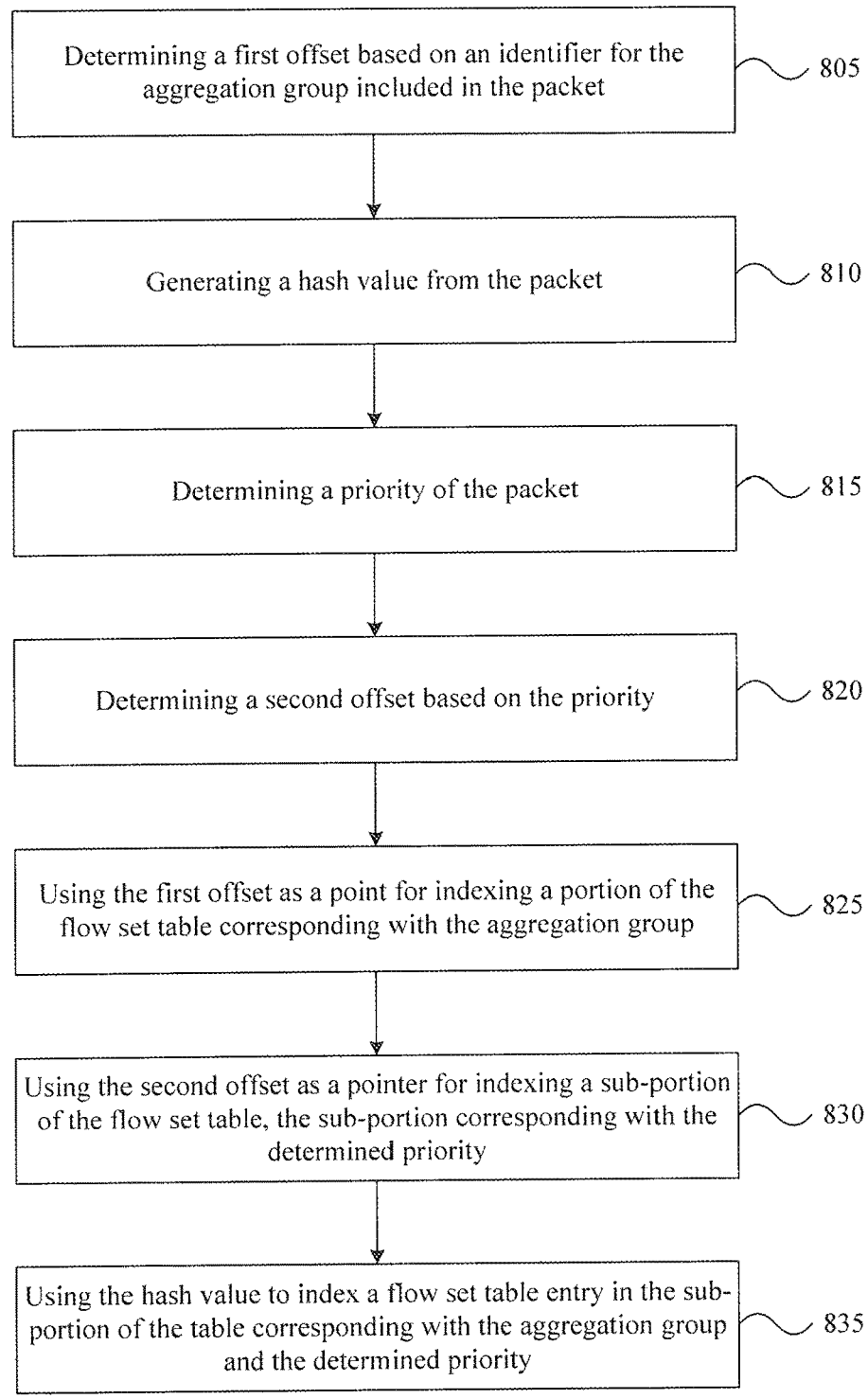
FIG. 8 illustrates a flowchart of a method for indexing a flow set table in accordance with embodiments of the present disclosure.

FIG. 8 illustrate a flowchart 800 of a method for indexing a flow set table in accordance with embodiments of the present disclosure. The method of the flowchart 800 includes, at block 805, determining a first offset based on an identifier for the aggregation group included in the packet. The method of the flowchart 800 further includes, at block 810, generating a hash value from the packet, such as by using a fixed set of packet fields and a hash function (e.g., a CRC hash function or an XOR hash function). At block 815, the method of the flowchart 800 includes determining a priority of the packet and, at block 820, determining a second offset based on the priority. In the method of the flowchart 800, at block 825, the first offset can be used as a pointer for indexing a portion of the flow set table corresponding with the aggregation group. At block 830, the method of the flowchart 800 can include using the second offset as a pointer for indexing a sub-portion of the flow set table corresponding with the aggregation group, where the sub-portion corresponds with the determined priority and the aggregation group indicated in the packet. The method of the flowchart 800 further includes, at block 835, using the hash value to index a flow set table entry in the sub-portion of the table corresponding with the aggregation group and the determined priority.

Figure 9:
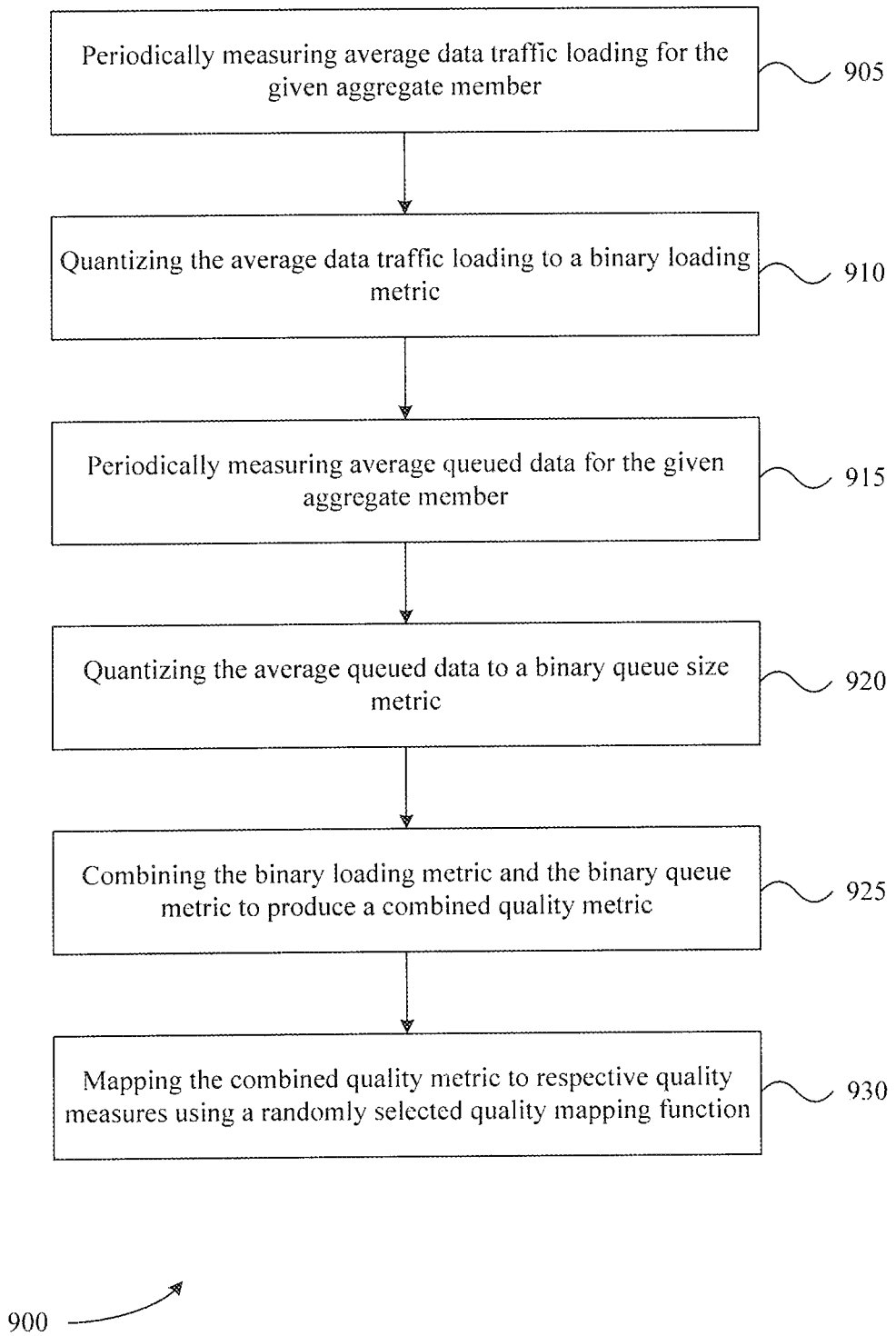
FIG. 9 illustrates a flowchart of a method for determining a quality measure in accordance with embodiments of the present disclosure.

FIG. 9 illustrates a flowchart 900 of a method for determining a quality measure for a given aggregate member in accordance with embodiments of the present disclosure. The method of the flowchart 900 can be used to determine a quality measure using, for example, the techniques described above with respect to FIGS. 5A-5C, though other approaches exist. The method of the flowchart 900, at block 905 includes periodically measuring average data traffic loading for the given aggregate member, such as using the imbalance detection module 214 illustrated in FIG. 2. The method of the flowchart 900 further includes, at block 910, quantizing the average data traffic loading to a binary loading metric. The quantization at block 910 can be accomplished using the average traffic loading and the table 500 illustrated in FIG. 5A. The method 900 can further include periodically measuring an average queued data amount for the given aggregate member, such as using the aggregate member queues 212 and/or and the imbalance detection module 214, as discussed above.

The method of the flowchart 900 can further include, at block 920, quantizing the average queued data to a binary queue size metric. The quantization at block 920 can be accomplished using the average queued data amount measurement and the table 510 illustrated in FIG. 5B. At block 925, the method of the flowchart 900 includes combining the binary loading metric and the binary queue size metric to produce a combined quality metric, such as using the techniques illustrated in FIG. 5C. For instance, such a combined quality metric can be a concatenation of the quality metrics determined at blocks 910 and 920. At block 930, the method of the flowchart 900 further includes mapping the combined quality metric to a respective quality measure using a quality mapping function, as was also discussed with respect to FIG. 5C.

Figure 10:
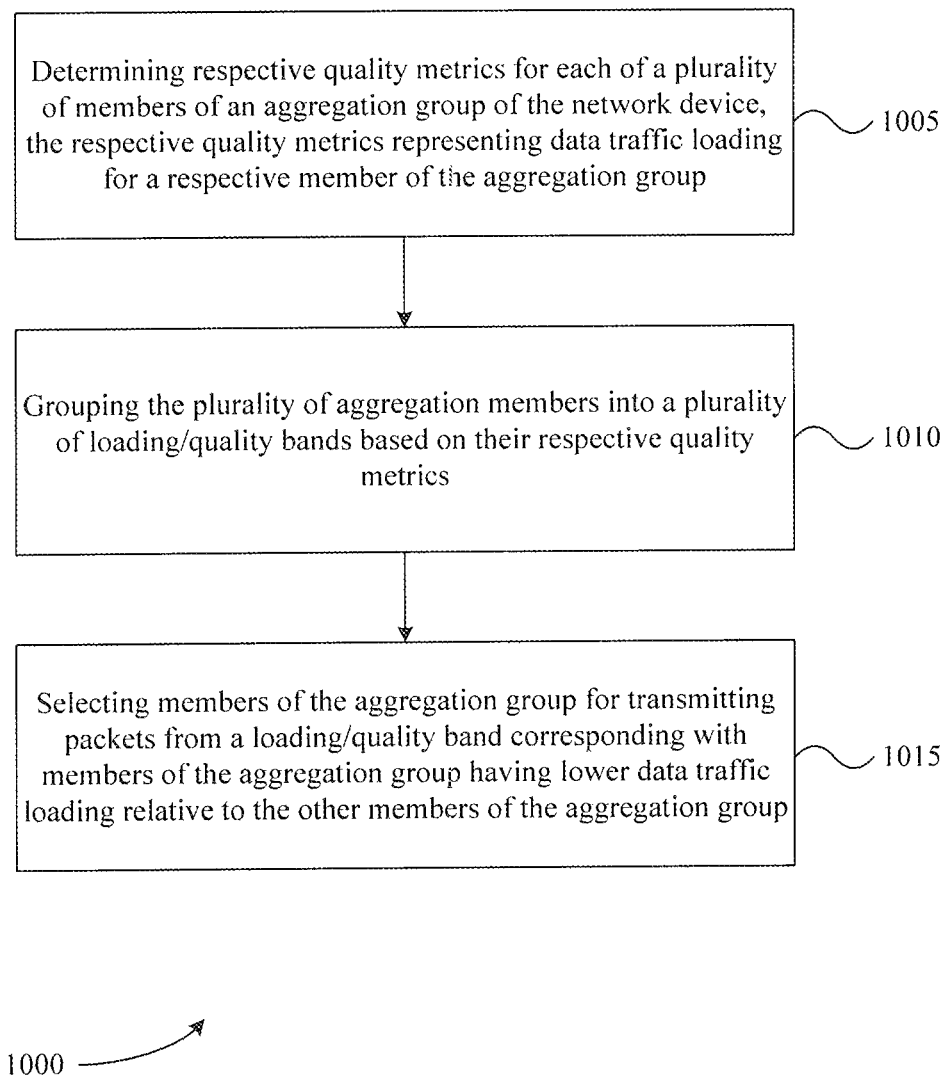
FIG. 10 illustrates a flowchart of a method for generating quality/loading bands for an aggregation group and selecting an aggregate member using the quality/loading bands in accordance with embodiments of the present disclosure.

FIG. 10 illustrates a flowchart 1000 of a method for generating quality/loading bands for an aggregation group and selecting an aggregate member using the quality/loading bands in accordance with embodiments of the present disclosure. The method of the flowchart 1000 includes, at block 1005, determining (e.g., by a network device) respective quality metrics for each of a plurality of members of an aggregation group of the network device. In the method of the flowchart 1000, the respective quality metrics can represent respective data traffic loading for each member of the aggregation group, such as described above with respect to FIGS. 5A-5C, for example.

The method of the flowchart 1000 can further include, at block 1010, grouping the plurality of aggregation members into a plurality of loading/quality bands based on their respective quality metrics, such as was illustrated in FIG. 6, for example. At block 1015, the method of the flowchart 1000 includes selecting members of the aggregation group for transmitting packets from a loading/quality band corresponding with members of the aggregation group having lower data traffic loading relative to the other members of the aggregation group, e.g., by selecting an aggregate member from a highest non-empty loading/quality band.

In the method of the flowchart 1000, the respective quality metrics can be based on at least one of port loading corresponding with each aggregate member and an amount of queued data corresponding with each aggregate member. For instance, each respective quality metric can be determined by combining a first quality metric corresponding with respective port loading and a second quality metric corresponding with the respective amount of queued data, such as was described above with respect to FIGS. 5A-5C. In other approaches, a number of available transmission credits can be used as a metric for determining link quality.

In the method of the flowchart 1000, selecting members of the aggregation group at block 1015 can comprise randomly selecting members of the aggregation group. Alternatively, selecting members of the aggregation group at block 1015 can comprise deterministically selecting members of the aggregation group, such as using round-robin selection, for example.

In addition to the above, in some instances all members of an aggregation group can be loaded with large amounts of data or have an associated large queue size. For example, the paths 108-112 of the aggregation group 106 in FIG. 1 can all be loaded with large amounts of data or have associated large queue sizes. As a result, the quality metric of each member in the aggregation group may be poor, resulting in high latency or high end-to-end delay in delivering packets of a data flow from a source network device to a destination network device irrespective of which member of the aggregate group is selected to service the data flow.

In these instances, a member of an alternative aggregation group that also includes paths between the source network device and the destination network device may be able to provide better performance in terms of latency or end-to-end delay than the members of the primary aggregation group that have poor associated quality metrics. The alternative aggregation group can often provide better performance in terms of latency and/or end-to-end delay than the members of the primary aggregation group despite the fact that the members of the alternative aggregation group are generally higher cost paths than the typical least cost paths of the primary aggregation group. Path cost, as mentioned above, is often measured in terms of number of links within a path, with more links corresponding to a higher cost. Thus, the above approach is somewhat counter intuitive because it looks to higher cost paths to provide better performance than lower cost paths.

An alternative aggregation group can be formed in a number of different ways. For example, similar to a primary aggregation group with typically least cost paths, a route computation process (RCP) can be used to determine the connectivity in the data network 100 and compute non-least cost paths between the source 102 and the destination 104. Some or all of these non-least cost paths can be aggregated in an alternative aggregation group and pushed to a forwarding information base (FIB) in a source destination device. The source destination device can use the FIB to look up both the primary aggregation group, as described above, and the alternative aggregation group in order to forward packets of a data flow to a destination network device. It should be noted that more than one alternative aggregate group can be formed, with each alternative aggregate group generally including paths with the same or similar cost.

Figure 11:
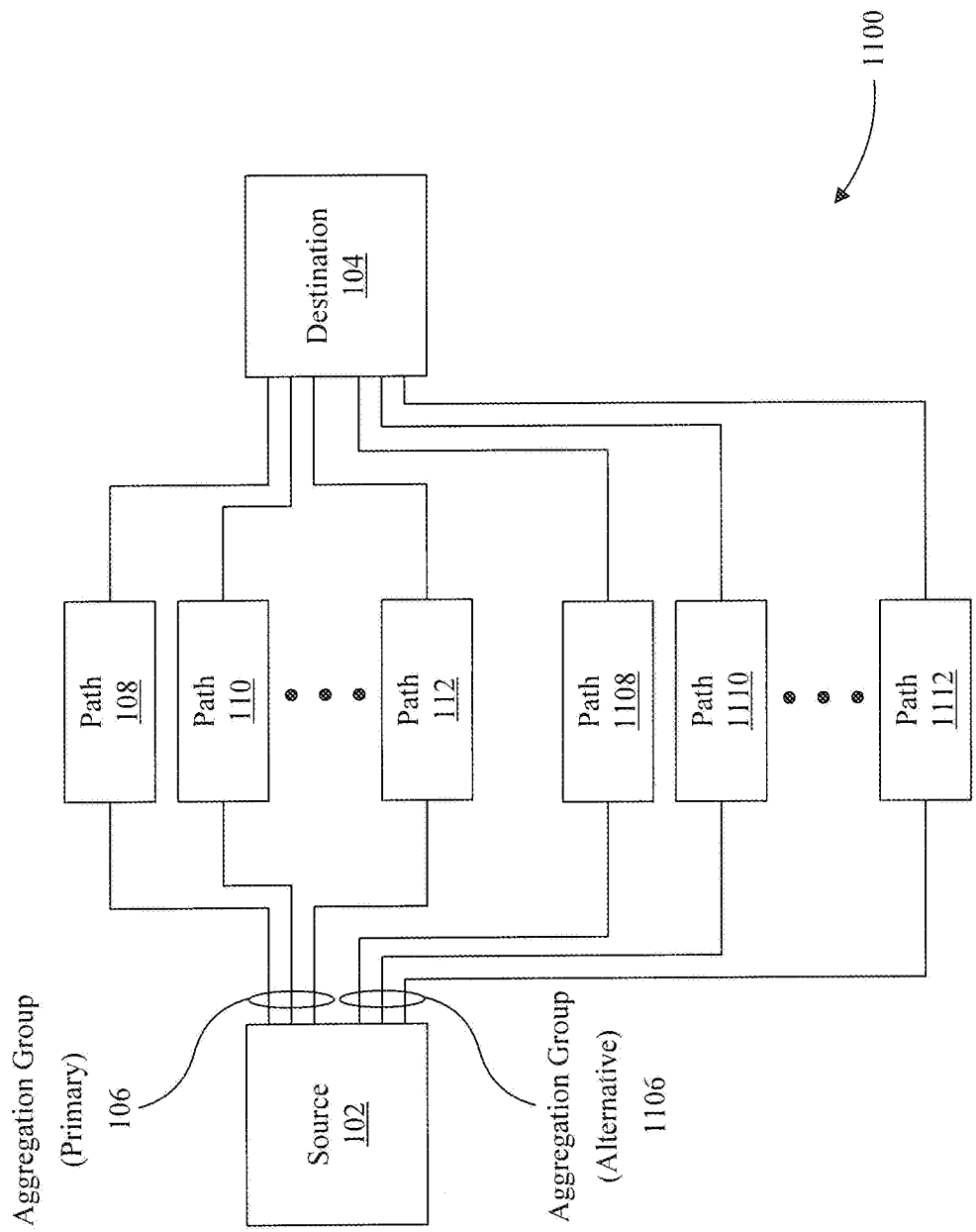
FIG. 11 illustrates a block diagram of a data network in accordance with embodiments of the present disclosure.
Figure 12:
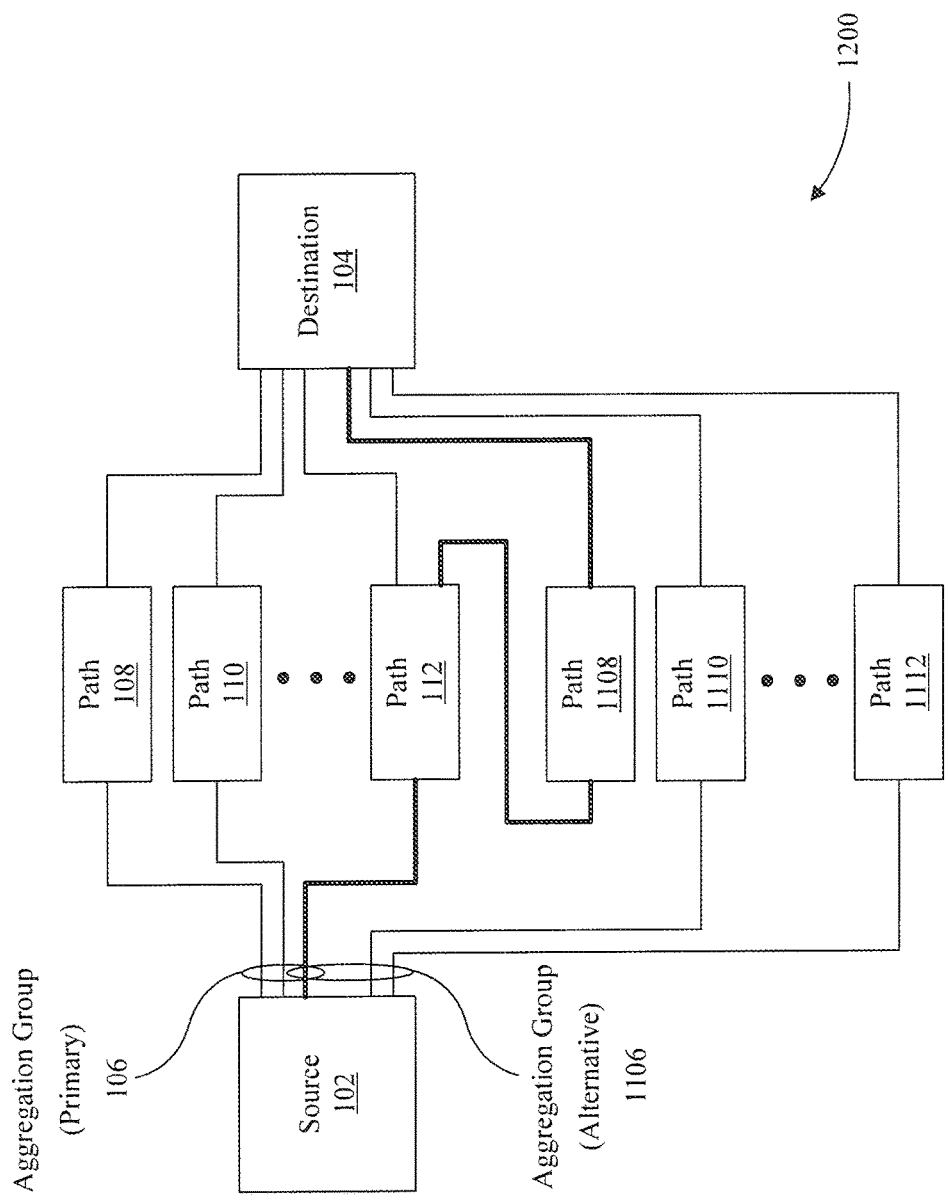
FIG. 12 illustrates another block diagram of a data network in accordance with embodiments of the present disclosure.

FIG. 11 illustrates a block diagram of a data network 1100 in accordance with embodiments of the present disclosure. The data network 1100 has a similar configuration as the data network 100 in FIG. 1 with the exception of an alternative aggregation group 1106 that includes paths or members 1108-1112. The paths 1108-1112 can be higher cost paths than paths 108-112 in the primary aggregation group 106. FIG. 12 illustrates another block diagram of a data network 1200 in accordance with embodiments of the present disclosure. The data network 1200 has a similar configuration as the data network 1100 in FIG. 11 but illustrates the possibility of a path from the alternative aggregation group 1106 using one or more links of a path from the primary aggregation group. In particular, as shown in FIG. 12, the path 1108 from the alternative aggregation group uses one or more links of the path 112 in the primary aggregation group 106.

In both FIGS. 11 and 12, the alternative aggregation group 1106 can be formed and used, as described above, when the members of the primary aggregation group 106 all have poor associated quality metrics due to, for example, high loading and/or large queue sizes. The respective quality metrics of the members of the primary aggregation group 106 can represent respective data traffic loading, such as described above with respect to FIGS. 5A-5C, for example.

The use of alternative aggregation group 1106 in such instances can be more specifically described by referring back to the network device 200 in FIG. 2 and providing a slightly modified description or additional embodiment of its functionality. The network device 200 can be configured to dynamically assign data flows to members of the primary aggregation group 106 and the alternative aggregation group 1106. Such member assignments can take into account the relative loading of the members of the primary aggregation group 106 and the alternative aggregation group 1106 and/or changes in the loading conditions of the members of the primary aggregation group 106 and the alternative aggregation group 1106. Further, the network device 200 can be configured to re-assign data flows from one member of the primary aggregation group 106 or the alternative aggregation group 1106 to another member of the primary aggregation group 106 or the alternative aggregation group 1106 when those flows have been inactive for a sufficient period of time so as to prevent re-ordering of packets of the data flows upon arrival at a next hop network device or a destination network device.

As shown in FIG. 2, the network device 200 can receive the packet 202 at the data port 204. After the packet 202 is received at the data port 204, the flow identification (flow ID) module 206 can process the packet 202, as described above in detail, to determine a flow ID for a data flow to which the data packet 202 belongs. Depending on the particular situation, the flow ID can correspond with a single active data flow (e.g., a micro-flow) or can correspond with multiple data flows that are active concurrently (e.g., as part of a macro-flow).

In the network device 200, the flow state module 208 can determine the state of the data flow with which the packet 202 is associated as described above in detail. The state of the data flow is determined to be either active, inactive, or new. Once the flow state module 208 determines the state of the data flow associated with the packet 202, a member assignment module 210 can determine which member of the primary aggregation group 106 of the network device 200 or the alternative aggregation group 1106 of the network device 200 should be used to communicate the packet 202 to its next destination.

If the data flow associated with the data packet 202 is determined to be eligible for member assignment (e.g., because the data flow in new) or reassignment (e.g., because the data flow has is inactive), the network device 200 can assign the data flow associated with the packet 202 to a member of the primary aggregation group 106 or the alternative aggregation group 1106 based on a quality metric associated with each of the aggregation group members.

For example, a quality metric can be determined for each member of the primary aggregation group 106 and the alternative aggregation group 1106 as described above in regard to FIGS. 5A-5C. The members of each aggregation group can then be grouped into quality bands based on their associated quality metric as further described above in regard to FIG. 6. When assigning an aggregate member to a data flow, the network device 200 can select the member from the highest non-empty quality band having at least one aggregate member in it from the primary aggregate group 106 and the member from the highest non-empty quality band having at least one aggregate member in it from the alternative aggregate group 1106. In the instance where more than one member is in the highest non-empty quality band of an aggregate group, a member can be selected at random or in a deterministic way as described above. The network device 200 can compare the quality metrics associated with the two members respectively selected from the primary aggregate group 106 and the alternative aggregate group 1106 and assign the aggregate member among the two members with the highest quality metric to the data flow eligible for assignment or reassignment.

However, in any deployment scenario, there will typically be an added cost to using a member from the alternative aggregation group 1106 or a bias in favor of using a member from the alternative aggregation group 1106 under certain circumstances. To this end, two parameters can be defined: COST and BIAS. Prior to comparing the quality metrics associated with the two members respectively selected from the primary aggregation group 106 and the alternative aggregation group 1106, the COST parameter can be added to the quality metric of the primary aggregation group member and the BIAS parameter can be added to the quality metric of the alternative aggregation group member. The COST and BIAS parameter can be defined in several manners, including by a user.

In addition to the optional COST and BIAS parameters, before comparing the quality metrics associated with the two members respectively selected from the primary aggregation group 106 and the alternative aggregation group 1106, the quality metric of the primary aggregation group member can first be compared to a THRESHOLD parameter. If the quality metric of the primary aggregation group member is greater than the THRESHOLD parameter, the primary aggregation group member can be assigned to the data flow eligible for assignment or reassignment. In other words, the THRESHOLD parameter can be defined such that the alternative aggregation group member is only considered when the quality metric of the primary aggregation group member is below the THRESHOLD parameter. The use of one or more alternative aggregation groups can enable an adaptive routing paradigm that effectively utilizes alternate paths in a network topology that would normally remain unused, thus contributing to higher bandwidth and reliability.

If a data flow associated with the data packet 202 is not eligible for assignment or reassignment, the network device 200 (or, more particularly, the member assignment module 210) can use a previously assigned aggregation group member, such as indicated in a flow set table entry associated with the data flow. Each time a packet associated with an active data flow is processed the flow set table entry for that flow can be updated with a new timestamp. Using such an approach, the delay between packets of a given data flow can be readily determined, where the determined delay between packets of the given data flow can be used to determine whether the given data flow can receive a new assignment without significant risk of packet reordering.

After the assigned aggregation group member is determined (by assignment, reassignment, or using an existing assignment), the network device 200 can queue the data packet 202 in a respective data queue for the assigned aggregation group member in the set of aggregate member queues 212. The network device 200 can then communicate the data packet 202, in turn with other packets queued in the aggregate member queues 212, to another network device, such as a next hop network device or a destination network device, using the assigned aggregation group member.

As shown in FIG. 2, the network device 200 can also include the imbalance detection module 214. The imbalance detection module 214 can receive information regarding member assignments for data packets from member assignment module 210 and can also receive information regarding the amount of data that is queued for each member of an aggregation group from the aggregate member queues 212. Based on the information received from the member assignment module 210 and the aggregate member queues 212, the imbalance detection module 214 can determine one or more quality metrics for the aggregation group members, where the quality metrics are indicative of data traffic loading for each aggregate member. These quality metrics can be communicated to the member assignment module 210 and used by the member assignment module 210 when making aggregation group member assignments and reassignments for data flows being processed by the network device 200 as described above.

Figure 13:
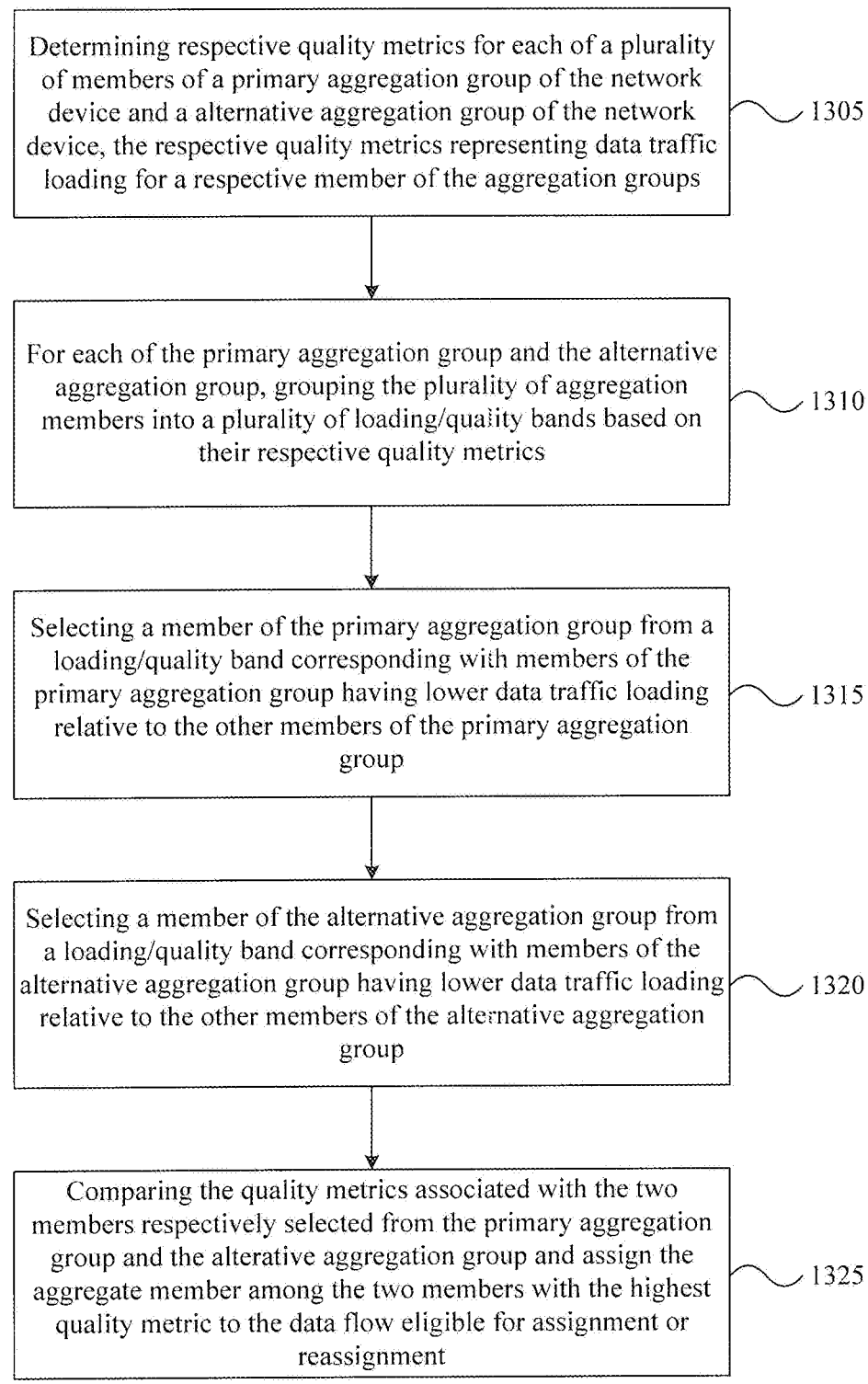
FIG. 13 illustrates a flowchart of a method for generating quality/loading bands for aggregation groups and selecting an aggregate member using the quality/loading bands in accordance with embodiments of the present disclosure.

FIG. 13 illustrates a flowchart 1300 of a method for generating quality/loading bands for a primary aggregation group and an alternative aggregation group and selecting an aggregate member using the quality/loading bands in accordance with embodiments of the present disclosure. The method of the flowchart 1300 includes, at block 1305, determining (e.g., by a network device) respective quality metrics for each of a plurality of members of the primary aggregation group and the alternative aggregation group of the network device. In the method of the flowchart 1300, the respective quality metrics can represent respective data traffic loading for each member of the aggregation group, such as described above with respect to FIGS. 5A-5C, for example.

At block 1310, the method of the flowchart 1300 can further include grouping, for each of the primary aggregation group and the alternative aggregation group, the plurality of aggregation members into a plurality of loading/quality bands based on their respective quality metrics, such as was illustrated in FIG. 6, for example.

At block 1315, the method of the flowchart 1300 includes selecting a member of the primary aggregation group from a loading/quality band corresponding with members of the primary aggregation group having lower data traffic loading relative to the other members of the primary aggregation group, e.g., by selecting an aggregate member from a highest non-empty loading/quality band.

At block 1320, the method of the flowchart 1300 includes selecting a member of the alternative aggregation group from a loading/quality band corresponding with members of the alternative aggregation group having lower data traffic loading relative to the other members of the alternative aggregation group, e.g., by selecting an aggregate member from a highest non-empty loading/quality band.

In the method of the flowchart 1300, the respective quality metrics can be based on at least one of port loading corresponding with each aggregate member and an amount of queued data corresponding with each aggregate member. For instance, each respective quality metric can be determined by combining a first quality metric corresponding with respective port loading and a second quality metric corresponding with the respective amount of queued data, such as was described above with respect to FIGS. 5A-5C. In other approaches, a number of available transmission credits can be used as a metric for determining link quality.

In the method of the flowchart 1300, selecting a member of the primary aggregation group and a member of the alternative aggregation group at blocks 1315 and 1320, respectively, can comprise randomly selecting a member of the primary aggregation group and the alternative aggregation group. Alternatively, selecting a member of the primary aggregation group and a member of the alternative aggregation group at blocks 1315 and 1320, respectively, can comprise deterministically selecting a member of the primary aggregation group and the alternative aggregation group, such as using round-robin selection, for example.

At block 1325, the method of the flowchart 1300 includes comparing the quality metrics associated with the two members respectively selected from the primary aggregation group and the alternative aggregation group and assign the aggregate member among the two members with the highest quality metric to the data flow eligible for assignment or reassignment.

However, in any deployment scenario, there will typically be an added cost to using a member from the alternative aggregation group or a bias in favor of using a member from the alternative aggregation group under certain circumstances. To this end, two parameters can be defined as discussed above: COST and BIAS. Prior to comparing the quality metrics associated with the two members respectively selected from the primary aggregation group and the alternative aggregation group, the COST parameter can be added to the quality metric of the primary aggregation group member and the BIAS parameter can be added to the quality metric of the alternative aggregation group member. The COST and BIAS parameter can be defined in several manners, including by a user.

In addition to the optional COST and BIAS parameters, before comparing the quality metrics associated with the two members respectively selected from the primary aggregation group and the alternative aggregation group, the quality metric of the primary aggregation group member can first be compared to a THRESHOLD parameter. If the quality metric of the primary aggregation group member is greater than the threshold parameter, the primary aggregation group member can be assigned to the data flow eligible for assignment or reassignment. In other words, the threshold parameter can be defined such that the alternative aggregation group member is only considered when the quality metric of the primary aggregation group member is below the threshold parameter.

Implementations of the various techniques described herein can be implemented in digital electronic circuitry, or in computer hardware, firmware, software, or in combinations of them. Implementations can implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions by operating on input data and generating output. Method steps also can be performed by, and an apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include at least one processor for executing instructions and one or more memory devices for storing instructions and data. Generally, a computer also can include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

To provide for interaction with a user, implementations can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback: and input from the user can be received in any form, including acoustic, speech, or tactile input.

Implementations can be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components can be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the present disclosure.

What is claimed is:

1. A method comprising:

receiving, at a network device, a data packet to be sent via a primary aggregation group or an alternative aggregation group, the primary aggregation group comprising a plurality of primary aggregate members and the alternative aggregation group comprising a plurality of alternative aggregate members;

determining, based on the data packet, a flow identifier of a flow to which the data packet belongs;

determining a state of the flow using the flow identifier;

grouping: the plurality of primary aggregate members into a first set of loading/quality bands based on respective quality measures for the plurality of primary aggregate members, and the plurality of alternative aggregate members into a second set of loading/quality bands based on respective quality measures for the plurality of alternative aggregate members, selecting: a primary member from a loading/quality band in the first set of loading/quality bands that corresponds to a lowest data traffic load among the first set of loading/quality bands, and an alternative member from a loading/quality band in the second set of loading/quality bands that corresponds to a lowest data traffic load among the second set of loading/quality bands; and assigning a chosen member, based on the state of the flow determined to be new or inactive, for communicating the data packet, wherein the chosen member is assigned from among the plurality of primary aggregate members and the plurality of alternative aggregate members based on a comparison between the quality measure for the selected primary member and the quality measure for the selected alternative member.

2. The method of claim 1, wherein, prior to the comparison between the quality measure for the selected primary member and the quality measure for the selected alternative member, the quality measure for the selected primary member is compared to a threshold parameter.

3. The method of claim 1, wherein the respective quality measures for the plurality of primary aggregate members are determined based on respective data traffic loading and respective amounts of queued data for each of the plurality of primary aggregate members.

4. The method of claim 1, further comprising:
periodically measuring, average data traffic loading for the chosen member;
quantizing the average data traffic loading to a binary loading metric;
periodically measuring average queued data for the chosen member;
quantizing the average queued data to a binary queue size metric;
combining the binary loading metric and the binary queue size metric to produce a combined quality metric; and
mapping the combined quality metric to the respective quality measure for the chosen member using a quality mapping function.

5. The method of claim 1, wherein determining the state of the flow is inactive comprises determining a difference between a previous timestamp associated with the flow in a flow set table and a timestamp corresponding with the data packet, wherein if the difference is greater than an inactivity duration, the flow is inactive.

6. The method of claim 5, wherein the inactivity duration is greater than a path skew associated with multiple paths.

7. The method of claim 1, wherein determining the state of the flow is new comprises determining whether a flow set entry in a flow set table corresponding with the flow is valid, wherein if the flow set entry is not valid, the state of the flow is new.

8. A network device comprising:
a data port configured to transmit a data packet over a primary aggregation group or an alternative aggregation group of the network device, the primary aggregation group comprising a plurality of primary aggregate members and the alternative aggregation group comprising a plurality of alternative aggregate members;
a flow identification module, implemented by one or more programmed processors, configured to determine, based on the data packet, a flow identifier of a flow to which the data packet belongs;
a flow state module, implemented by the one or more programmed processors, configured to determine a state of the flow based on the flow identifier; and
an aggregate member assignment module, implemented by the one or more programmed processors, configured to:
group: the plurality of primary aggregate members into a first set of loading/quality bands based on respective quality measures for the plurality of primary aggregate members, and the plurality of alternative aggregate members into a second set of loading/quality bands based on respective quality measures for the plurality of alternative aggregate members;
select: a primary member from a loading/quality band in the first set of loading/quality bands that corresponds to a lowest data traffic load among the first set of loading/quality bands, and an alternative member from a loading/quality band in the second set of loading/quality bands that corresponds to a lowest data traffic load among the second set of loading/quality bands;
assign, based on the state of the flow determined to be new or inactive, a chosen member for communicating the data packet, wherein the chosen member is assigned from among the plurality of primary aggregate members and the plurality of alternative aggregate members based on a comparison between the quality measure for the selected primary member and the quality measure for the selected alternative member.

9. The network device of claim 8, wherein, prior to the comparison between the quality measure for the selected primary member and the quality measure for the selected alternative member, the quality measure for the selected primary member is compared to a threshold parameter.

10. The network device of claim 8, wherein the respective quality measures for the plurality of primary aggregate members are determined based on respective data traffic loading and respective amounts of queued data for each of the plurality of primary aggregate members.

11. The network device of claim 8, wherein the flow state module is configured to determine the state of the flow is inactive based on a difference between a previous timestamp associated with the flow in a flow set table and a timestamp corresponding with the data packet.

12. The network device of claim 8, wherein the flow state module is configured to determine the state of the flow is new based on whether a flow set entry in a flow set table corresponding with the flow is valid.

13. A method comprising:
receiving, at a network device, a data packet to be sent via a primary aggregation group or an alternative aggregation group, the primary aggregation group comprising a plurality of primary aggregate members and the alternative aggregation group comprising, a plurality of alternative aggregate members;
grouping: the plurality of primary aggregate members into a first set of loading/quality bands based on respective quality measures for the plurality of primary aggregate members, and the plurality of alternative aggregate members into a second set of loading/quality bands based on respective quality measures for the plurality of alternative aggregate members,
selecting: a primary member from a loading/quality band in the first set of loading/quality bands that corresponds to a lowest data traffic load among the first set of loading/quality bands, and an alternative member from a loading/quality band in the second set of loading/quality bands that corresponds to a lowest data traffic load among the second set of loading/quality bands; and
assigning a chosen member, based on a flow to which the data packet belongs being new or inactive, for communicating the data packet, wherein the chosen member is assigned from among the plurality of primary aggregate members and the plurality of alternative aggregate members based on a comparison between the quality measure for the selected primary member and the quality measure for the selected alternative member.

14. The method of claim 13, wherein, prior to the comparison between the quality measure for the selected primary member and the quality measure for the selected alternative member, the quality measure for the selected primary member is compared to a threshold parameter.

15. The method of claim 13, wherein the respective quality measures for the plurality of primary aggregate members are determined based on respective data traffic loading and respective amounts of queued data for each of the plurality of primary aggregate members.

16. The method of claim 13, further comprising:
periodically measuring average data traffic loading for the chosen member; and
quantizing the average data traffic loading to a binary loading metric.

17. The method of claim 16, further comprising:
periodically measuring average queued data for the chosen member; and
quantizing the average queued data to a binary queue size metric.

18. The method of claim 17, further comprising:
combining the binary loading metric and the binary queue size metric to produce a combined quality metric; and
mapping the combined quality metric to the respective quality measure for the chosen member using a quality mapping function.

19. The method of claim 13, further comprising:
prior to the comparison between the quality measure for the selected primary member and the quality measure for the selected alternative member, adding a cost parameter to the quality measure for the selected primary member.

20. The method of claim 13, further comprising:
prior to the comparison between the quality measure for the selected primary member and the quality measure for the selected alternative member, adding a bias parameter to the quality metric for the selected alternative member.

* * * * *

UNITED STATES PATENT AND TRADEMARK OFFICE
CERTIFICATE OF CORRECTION

PATENT NO. : 10,057,174 B2
APPLICATION NO. : 14/881661
DATED : August 21, 2018
INVENTOR(S) : Niranjan Shankar Vaidya It is certified that error appears in the above-identified patent and that said Letters Patent is hereby corrected as shown below:

In the Claims

Column 21, Line 10, please replace "measuring, average data" with --measuring average data--.

Column 22, Line 37, please replace "comprising, a plurality" with --comprising a plurality--.

Signed and Sealed this
Fourth Day of December, 2018

Andrei Iancu
*Director of the United States Patent and Trademark Office*